(12) United States Patent
Hong et al.

(10) Patent No.: US 8,593,096 B1
(45) Date of Patent: Nov. 26, 2013

(54) VOICE COIL MOTOR CONTROL SYSTEM AND METHOD

(75) Inventors: Jye Sheng Hong, Singapore (SG); Siew Yong Chui, Singapore (SG)

(73) Assignee: Marvell International Ltd., Hamilton (BM)

(*) Notice: Subject to any disclaimer, the term of this patent is extended or adjusted under 35 U.S.C. 154(b) by 0 days.

(21) Appl. No.: 13/607,974

(22) Filed: Sep. 10, 2012

Related U.S. Application Data

(63) Continuation of application No. 12/957,218, filed on Nov. 30, 2010, now Pat. No. 8,283,882, which is a continuation of application No. 12/131,730, filed on Jun. 2, 2008, now Pat. No. 7,852,028.

(60) Provisional application No. 60/943,134, filed on Jun. 11, 2007.

(51) Int. Cl.
*H02P 7/00* (2006.01)
*H02P 7/29* (2006.01)
*G05B 11/28* (2006.01)

(52) U.S. Cl.
USPC ......... 318/400.34; 318/811; 318/599; 360/75

(58) Field of Classification Search
USPC ................. 318/599, 811, 400.32, 400.34; 388/928.1; 360/73.03, 75
See application file for complete search history.

(56) References Cited

U.S. PATENT DOCUMENTS

| | | |
|---|---|---|
| 3,676,661 A | 7/1972 | Sprowl |
| 4,654,566 A | 3/1987 | Erdman |
| 4,876,491 A | 10/1989 | Squires et al. |
| 5,023,528 A | 6/1991 | Saidin et al. |
| 5,208,518 A | 5/1993 | Grapenthin et al. |
| 5,254,914 A | 10/1993 | Dunfield et al. |
| 5,345,156 A | 9/1994 | Moreira |
| 5,504,402 A | 4/1996 | Menegoli |
| 5,517,095 A | 5/1996 | Carobolante et al. |
| 5,615,064 A | 3/1997 | Blank et al. |
| 5,767,643 A | 6/1998 | Pham et al. |
| 5,801,509 A | 9/1998 | Sawa et al. |
| 5,886,489 A | 3/1999 | Rowan et al. |
| 5,909,095 A | 6/1999 | Sakti et al. |
| 5,929,577 A | 7/1999 | Neidorff et al. |
| 5,990,643 A | 11/1999 | Holling et al. |
| 6,040,671 A | 3/2000 | Brito et al. |
| 6,081,112 A | 6/2000 | Carobolante et al. |
| 6,094,022 A | 7/2000 | Schillaci et al. |
| 6,137,253 A | 10/2000 | Galbiati et al. |
| 6,218,794 B1 | 4/2001 | Shimizu et al. |
| 6,233,610 B1 | 5/2001 | Hayball et al. |
| 6,236,174 B1 | 5/2001 | White |

(Continued)

*Primary Examiner* — Eduardo Colon Santana

(57) ABSTRACT

Analog control of the pulse width used to control the speed of a voice coil motor may be implemented using a "constant-current-charging-capacitor" configuration where the time needed to charge the capacitor is directly related to how far the actual motor speed is from the target speed. The BEMF voltage, indicative of motor speed, is sampled, and then stored in a storage capacitor, which is allowed to charge/discharge to a target voltage level. The time required to charge/discharge the capacitor to the target voltage is directly proportional to the difference between the BEMF voltage and the target voltage, and may be used directly as the pulse width (i.e., the charging time) in the PWM velocity control system. To avoid larger capacitors, a pulse multiplier circuit can be added, allowing charging/discharging the sampled voltage to the target voltage to be repeated by a number, N, of times.

20 Claims, 12 Drawing Sheets

(56) References Cited

U.S. PATENT DOCUMENTS

| | | |
|---|---|---|
| 6,259,099 B1 | 7/2001 | Foulon et al. |
| 6,323,610 B1 | 11/2001 | Ng et al. |
| 6,462,491 B1 | 10/2002 | Iijima et al. |
| 6,498,446 B1 | 12/2002 | Menegoli et al. |
| 6,501,242 B1 | 12/2002 | Erickson et al. |
| 6,542,324 B1 | 4/2003 | Galbiati et al. |
| 6,611,118 B2 | 8/2003 | Abe et al. |
| 6,628,096 B1 | 9/2003 | Chen |
| 6,631,045 B1 | 10/2003 | Pedrazzini |
| 6,633,145 B2 | 10/2003 | Shao et al. |
| 6,650,082 B1 | 11/2003 | Du |
| 6,697,207 B2 | 2/2004 | Harmer |
| 6,812,667 B2 | 11/2004 | Yasohara et al. |
| 6,879,129 B2 | 4/2005 | Tazawa et al. |
| 6,972,918 B2 | 12/2005 | Kokami et al. |
| 6,998,801 B2 | 2/2006 | Kurosawa et al. |
| 7,098,621 B1 | 8/2006 | Leong et al. |
| 7,102,307 B2 | 9/2006 | Shao |
| 7,138,776 B1 | 11/2006 | Gauthier et al. |
| 7,141,949 B2 | 11/2006 | Harwood |
| 7,196,484 B1 | 3/2007 | Chui et al. |
| 7,224,138 B2 | 5/2007 | DeCusatis et al. |
| 7,274,162 B1 | 9/2007 | Krishnamoorthy et al. |
| 7,466,095 B1 | 12/2008 | Chui |
| 7,504,789 B1 | 3/2009 | Chui et al. |
| 7,514,894 B2 | 4/2009 | Hoogzaad |
| 7,602,131 B1 | 10/2009 | Chui |
| 7,609,013 B2 | 10/2009 | Sugie |
| 7,622,880 B1 | 11/2009 | Chui et al. |
| 7,852,028 B1 | 12/2010 | Hong et al. |
| 7,863,842 B1 | 1/2011 | Krishnamoorthy et al. |
| 7,923,954 B1 | 4/2011 | Chui et al. |
| 7,924,526 B1 * | 4/2011 | Chui et al. ............ 360/75 |
| 2002/0027423 A1 | 3/2002 | White |
| 2002/0196575 A1 | 12/2002 | Harmer |
| 2003/0102834 A1 | 6/2003 | Hussein |
| 2003/0227707 A1 | 12/2003 | Kokami et al. |
| 2003/0234623 A1 | 12/2003 | Douglas |
| 2005/0157418 A1 | 7/2005 | Galbiati |
| 2010/0157467 A1 * | 6/2010 | Tieu ............... 360/75 |
| 2010/0182186 A1 | 7/2010 | Lin et al. |
| 2011/0234210 A1 * | 9/2011 | Hayashi et al. ........ 324/207.15 |

* cited by examiner

VOICE COIL MOTOR CONTROL SYSTEM AND METHOD

CROSS REFERENCE TO RELATED APPLICATIONS

This is a continuation of commonly-assigned U.S. patent application Ser. No. 12/957,218, filed Nov. 30, 2010, now U.S. Pat. No. 8,283,882, which is a continuation of commonly-assigned U.S. patent application Ser. No. 12/131,730, filed Jun. 2, 2008, now U.S. Pat. No. 7,852,028, which claims the benefit of U.S. Provisional Patent Application No. 60/943,134, filed Jun. 11, 2007, each of which is hereby incorporated by reference herein in its respective entirety.

BACKGROUND

This disclosure relates to a system and method for controlling the speed of an electric motor, and more particularly to a system and method for controlling the speed of a voice coil motor that moves the head of a disk drive.

In the event of a disk drive power failure, it is typical to use reserve power to retract the read/write head to prevent it from striking and damaging the platter surface. This function is known as "emergency retract" and can be performed as "blind retract" or "velocity-controlled retract." Velocity-controlled retract is preferable, because controlling the speed at which the voice coil motor (VCM) retracts the head prevents or at least minimizes damage to the head as a result of hitting the ramp stop too hard (if it is retracted too quickly). At the same time, the available power for performing the retract operation is limited, so a trade-off between velocity regulation and power consumption has to be made.

One known method for controlling the speed of the VCM uses pulse width modulation (PWM), applying power to the VCM in pulses to conserve power. The speed of the motor is controlled by the width or duration of the pulses. The speed may be determined by detecting the back-electromotive force (back-EMF, or BEMF) generated when current passes through the motor. Comparison of the actual speed, as represented by the actual BEMF, to a target speed, as represented by a target BEMF, can be used to control the pulse width. The BEMF profile may be divided into regions using an analog-to-digital converter (ADC), and decoded to the pulse width of the subsequent PWM drive.

In order to improve VCM speed control, it is desirable to increase the number of regions into which the BEMF profile is divided to provide finer adjustment of the pulse width. However, using a higher-resolution ADC during an emergency retract consumes more power at a time when power is at a premium. In addition, it may be desirable to make the pulse width programmable to accommodate different models of disk drive, or even differences among drives of the same model.

SUMMARY

Instead of using a high-resolution ADC to provide finer control of the pulse width used to control the speed of the VCM, analog voltage-to-time conversion may be used. If an analog signal is provided, the need for a digital speed decoder to allow a digital control signal to control the motor speed also may be eliminated. The direct analog method of voltage-to-time conversion may be implemented using a "constant-current-charging-capacitor" configuration where the time needed to charge the capacitor is directly related to how far the actual motor speed is from the target speed. Although the invention will be described hereafter in terms of the constant-current-charging-capacitor configuration, it may be possible to implement the invention with other configurations of analog electrical energy storage elements.

In accordance with embodiments of the invention, the BEMF voltage ($V_{BEMF}$), which is indicative of motor speed, is sampled, and then stored in a storage capacitor ($C_{BEMF}$). The $C_{BEMF}$ storage capacitor is then allowed to charge or discharge, as the case may be, to a target voltage level ($BEMF_{THRES}$). The $C_{BEMF}$ storage capacitor exhibits a linear voltage/time relationship, meaning that the time duration required to charge or discharge the capacitor to the target voltage level is directly proportional to the difference between the BEMF voltage ($V_{BEMF}$) and the target voltage. Therefore, that time duration may be used to derive the pulse width (i.e., the charging time) in the PWM velocity control system. The derivation may be a simple arithmetic manipulation, such as multiplying or dividing the duration by an integer, and indeed the duration may be used directly as the pulse width.

As the detected BEMF voltage $V_{BEMF}$ approaches the target voltage $BEMF_{THRES}$, the pulse width/charging time ($T_c$) gradually decreases. This is consistent with the motor speed requirements—as the speed (reflected by $V_{BEMF}$) approaches the target speed (reflected by $BEMF_{THRES}$) the required acceleration to be applied by the PWM velocity control system also decreases.

Once the target speed has been achieved (as indicated by $V_{BEMF}$ being at or near $BEMF_{THRES}$), the PWM velocity control system may enter a TRISTATE state. The TRISTATE state may be maintained as long as $V_{BEMF}$ remains within a target range of $BEMF_{THRES}$. In such a case, the system will continue to monitor $V_{BEMF}$ and will return to the charging state if $V_{BEMF}$ goes out of the target range.

In cases where the system configuration is such that longer pulse widths are required, a larger capacitor may be needed to provide the longer charging times corresponding to the longer pulse widths. As an alternative, a pulse multiplier circuit can be added to the analog voltage-to-time converter of an embodiment of the invention. The pulse multiplier circuit, if provided, allows charging/discharging of the sampled $V_{BEMF}$ to the target $BEMF_{THRES}$ to be repeated by a number, N, of times for each sampled $V_{BEMF}$, instead of increasing the pulse width. An additional buffer may be included in this embodiment to store the $V_{BEMF}$ value to allow repetition of the charging/discharging cycle. Because the capacitance of a capacitor is directly proportional to its area, use of the pulse multiplier circuit to multiply the number of pulses by N also decreases by a factor of N the area of the capacitor needed for the motor speed control circuit. This can be important in integrated circuit embodiments where die area may be at a premium.

Therefore, in accordance with embodiments of the present invention, there is provided a method for deriving control pulse width for pulse width modulation motor speed control. The method includes sampling back-EMF in a motor to be controlled, charging an analog electrical energy storage element to the sampled back-EMF, comparing the sampled back-EMF as stored on the analog electrical energy storage element to a target back-EMF, applying current to bring the back-EMF as stored on the analog electrical energy storage element to the target back-EMF, and setting the pulse width based on time required to bring the back-EMF as stored on the analog electrical energy storage element to the target back-EMF.

Apparatus for carrying out the method is also provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION OF THE INVENTION

As discussed above, analog voltage-to-time conversion may used to obtain fine control of VCM speed without the need for a high-resolution ADC or a digital speed decoder. The direct analog voltage-to-time conversion may be implemented using a "constant-current-charging-capacitor" configuration where the time needed to charge the capacitor ($C_{BEMF}$) is directly related to the BEMF detected. As the detected BEMF approaches a predetermined threshold (BEMF$_{THRES}$), the pulse width/charging time ($T_c$) gradually becomes smaller. Assuming a constant current, this voltage and time relationship may be expressed as follows:

$$T_c = (C_{BEMF}/I) \times |V_{BEMF} - BEMF_{THRES}|$$

Figure 1:
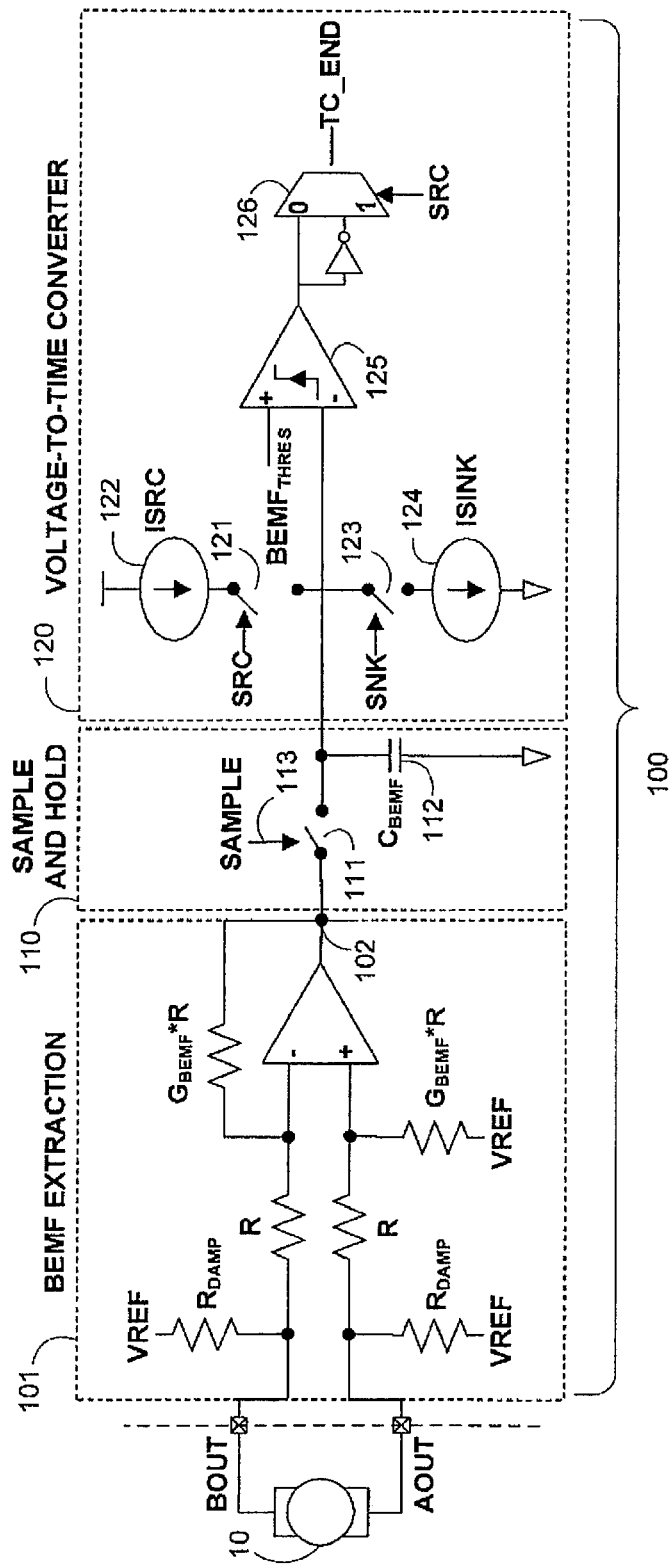
FIG. 1 is a schematic diagram of a first embodiment of a pulse width modulation velocity control circuit for a voice coil motor.

In the pulse width modulation velocity control circuit 100 of FIG. 1, BEMF extraction circuitry 101 outputs at 102 $V_{BEMF}$ captured from motor 10 and level shifted to $V_{REF}$ to satisfy the common mode input range of the circuit. $V_{REF}$ normally is chosen at the middle point between supply and ground voltages.

Sample-and-hold circuitry 110 of circuitry 100 samples $V_{BEMF}$ by closing sampling switch 111 at the beginning of the retract sequence and periodically thereafter when in the tristate period, after the motor current decays to zero, which holds $V_{BEMF}$ on $C_{BEMF}$ capacitor 112. The circuit will continue to cycle though the charge, discharge and tristate phases as long as $V_{BEMF}$ is out of the target velocity band. If the motor is within the target velocity band, as indicasted by $V_{BEMF}$, then the circuit will stay in the tristate phase.

$T_c$, the duration of the charging phase, is determined in voltage-to-time converter circuitry 120 as follows. If the magnitude of the sampled voltage, as determined prior to the charging phase, is less than BEMF$_{THRES}$, then SRC switch 121 is closed throughout the charging phase so that current is sourced from $I_{SRC}$ current source 122 to charge capacitor 112. If the magnitude of the sampled voltage is greater than BEMF$_{THRES}$, then SNK switch 123 is closed throughout the charging phase so that current is sunk to $I_{SINK}$ current sink 124 to discharge capacitor 112. During the charging phase, comparator 125 compares the voltage on capacitor 112 to BEMF$_{THRES}$. When comparator 125 trips, TC_END signal—output by multiplexer 126, which is controlled by the value of SRC so that it goes high when comparator 125 changes state—goes high, ending the charging phase.

Figure 2:
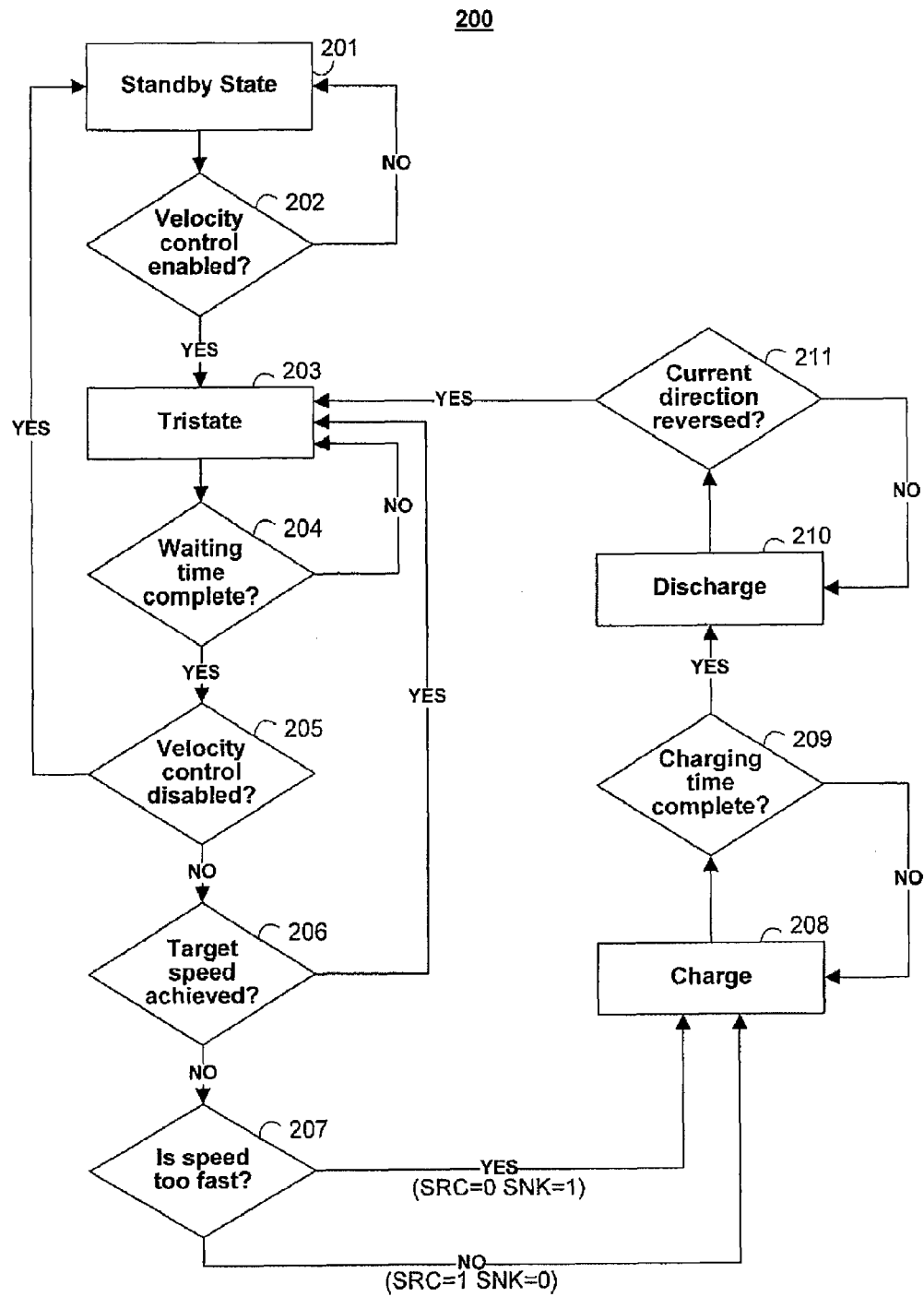
FIG. 2 is a flow chart showing the operation of the circuit of FIG. 1.

As shown in FIG. 2, circuit 100 functions like a state machine 200 with four states—namely STANDBY, TRISTATE, CHARGE and DISCHARGE. The system remains in STANDBY (state 201) until the velocity-controlled retract process is activated (test 202), whereupon the system cycles through the TRISTATE, CHARGE and DISCHARGE states 203, 208, 210 in a sequential manner to perform the retract function.

Specifically, the system starts the retract process in TRISTATE state 203 and remains there until a predetermined waiting period has elapsed (test 204). The waiting period is user programmable based on the time constant of the motor, to allow for the motor current to settle properly before sampling of the back-EMF. After the waiting period has elapsed, the system determines whether the retract process has been completed (velocity control disable test 205) and if so returns to STANDBY state 201. Otherwise, the system tests at 206 whether the target speed has been achieved (as represented by BEMF$_{THRES}$). If so, the system returns to TRISTATE state 203.

If, at test 206, it is determined that the target speed has not been achieved, then at test 207 the system determines whether the speed is too fast (speed too fast?=YES, meaning $|V_{BEMF}| > |BEMF_{THREG}|$) or too slow (speed too fast?=NO, meaning $|V_{BEMF}| < |BEMF_{THRES}|$). If the speed is too fast, the system sets SRC=0 and SNK=1 and enters CHARGE state 208. If the speed is too slow, the system sets SRC=1 and SNK=0 and enters CHARGE state 208.

The system remains in CHARGE state 208 until $T_c$ has elapsed as determined (test 209) by TC_END signal 126. The system then enters discharge state 210 where it remains until it detects a TD_END signal (test 211), whereupon it returns to TRISTATE state 203. The TD_END signal may be generated by a zero-current-sensing comparator (not shown) such as the one described in copending, commonly-assigned U.S. patent application Ser. No. 11/871,110, filed Oct. 11, 2007. The system will remain in TRISTATE state 203 as long as the target speed is maintained.

Figure 3:
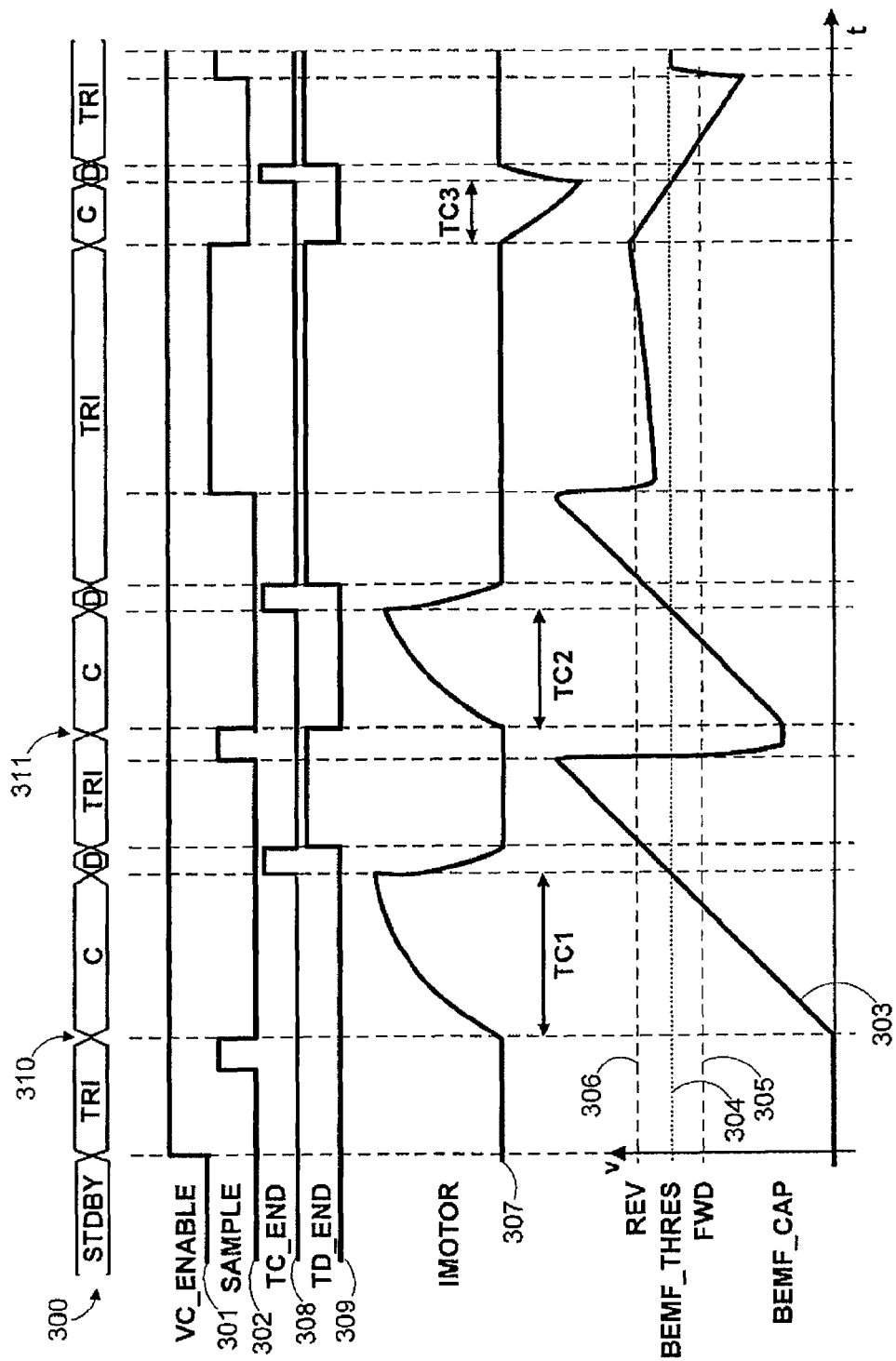
FIG. 3 shows representative signal waveforms during operation of the circuit of FIG. 1.

FIG. 3 shows the control signals and output signal waveforms of an embodiment of the pulse width modulation velocity control circuit 100. Signal 300 represents the state of the system—STANDBY (STDBY), TRISTATE (TRI), CHARGING (C) and DISCHARGING (D). Signal 301 is an enable signal representing the outcome of test 202 (above), which is low in the STANDBY state and otherwise high. Signal 302 is a sample signal, which goes high after the programmed predetermined waiting period has elapsed (test 204) from entry into the TRISTATE state. Signal 302 stays high for a minimum duration, but can remain high as long as $V_{BEMF}$ signal 303 as measured on capacitor 112 remains within a target range of BEMF$_{THRES}$ level 304, as indicated by FWD and REV threshold levels 305, 306.

As can be seen at points 310, 311, if the sampled $V_{BEMF}$ signal 303 as measured on capacitor 112 is below BEMF$_{THRES}$ level 304, then a charging period is entered during which a positive current $I_{MOTOR}$ 307 is developed until TC_END signal 308 goes high, whereupon a discharge period is entered during which the motor current $I_{MOTOR}$ 307 is discharged until TD_END signal 309 goes high, based on detection of $I_{MOTOR}$ 307 returning to zero.

As shown in the drawing, charging period TC2, beginning at point 311 is shorter than charging period TC1, beginning at point 310, because the detected value of $V_{BEMF}$ signal 303 at point 311 is closer to BEMF$_{THRES}$ than the detected value of $V_{BEMF}$ signal 303 at point 310.

Charging period TC3 is even shorter than either period TC1 or TC2 as the BEMF detected is even closer to BEMF$_{THRES}$. However, during period TC3, $V_{BEMF}$ is discharged down, rather than charged up, because the detected $V_{BEMF}$, while closer to BEMF$_{THRES}$, is higher than BEMF$_{THRES}$ rather than lower than BEMF$_{THRES}$.

As seen from the extended TRISTATE period between periods TC2 and TC3, the TRISTATE state can be prolonged indefinitely as long as the detected $V_{BEMF}$ remains within the BEMF target range.

Figure 4:
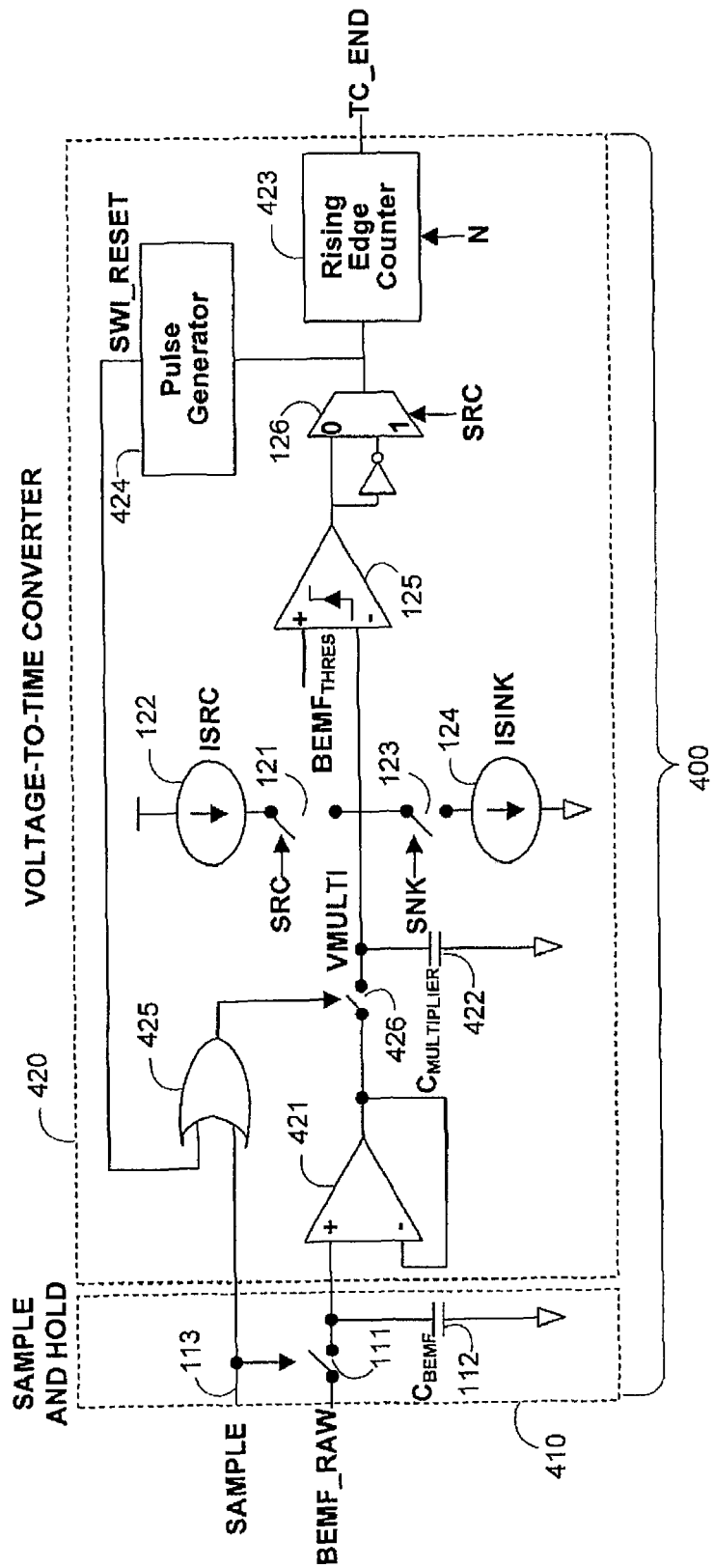
FIG. 4 is a schematic diagram of a first embodiment of a pulse width modulation velocity control circuit for a voice coil motor, including an embodiment of a pulse multiplier circuit.

FIG. 4 shows a pulse width modulation velocity control circuit 400, similar to circuit 100 (BEMF extraction circuitry not shown), but modified with pulse multiplier circuitry to provide a plurality of capacitor charging/discharging cycles to minimize the size of the required capacitor as discussed above.

In circuit 400, sample-and-hold circuitry 410 includes switch 111 and capacitor 112 as in sample-and-hold circuitry 110. However, unlike in sample-and-hold circuitry 110, in sample-and-hold circuitry 410, sample signal 113 is passed on as well to voltage-to-time converter circuitry 420. In voltage-to-time converter circuitry 420, the detected $V_{BEMF}$ on capacitor 112 is stored in buffer 421, which is sampled by $C_{MULTIPLIER}$ capacitor 422, which takes over the role of $C_{BEMF}$ capacitor 112 in determining the pulse width/charging time ($T_c$). Comparator 125, source 122 and sink 124 operate as they do in FIG. 1, except that they operate on the voltage stored on capacitor 422 instead of the voltage on capacitor 112. However, when comparator 125 trips in this case and multiplexer 126 goes high, instead of triggering a TC_END signal, a rising edge counter 423 increments and does not output a high TC_END until the count reaches a preset value N. The tripping of comparator 125 also triggers pulse generator 424 to output SWI_RESET pulse 423 which, through OR-gate 425, closes switch 426 which reads out the voltage in buffer 421 onto capacitor 422 (this switch also is closed, along with switch 111, by SAMPLE signal 113).

Thus, circuit 400 does not output a high TC_END until comparator 125 has been tripped N times. This is equivalent to increasing the capacitance of capacitor 112 of circuit 100 by a factor of N. Circuit 400 therefore saves that additional area. Because additional capacitor 422, as well as additional elements 423, 424, 425 and 426 are necessary, there may be no net savings unless N≥3.

Figure 5:
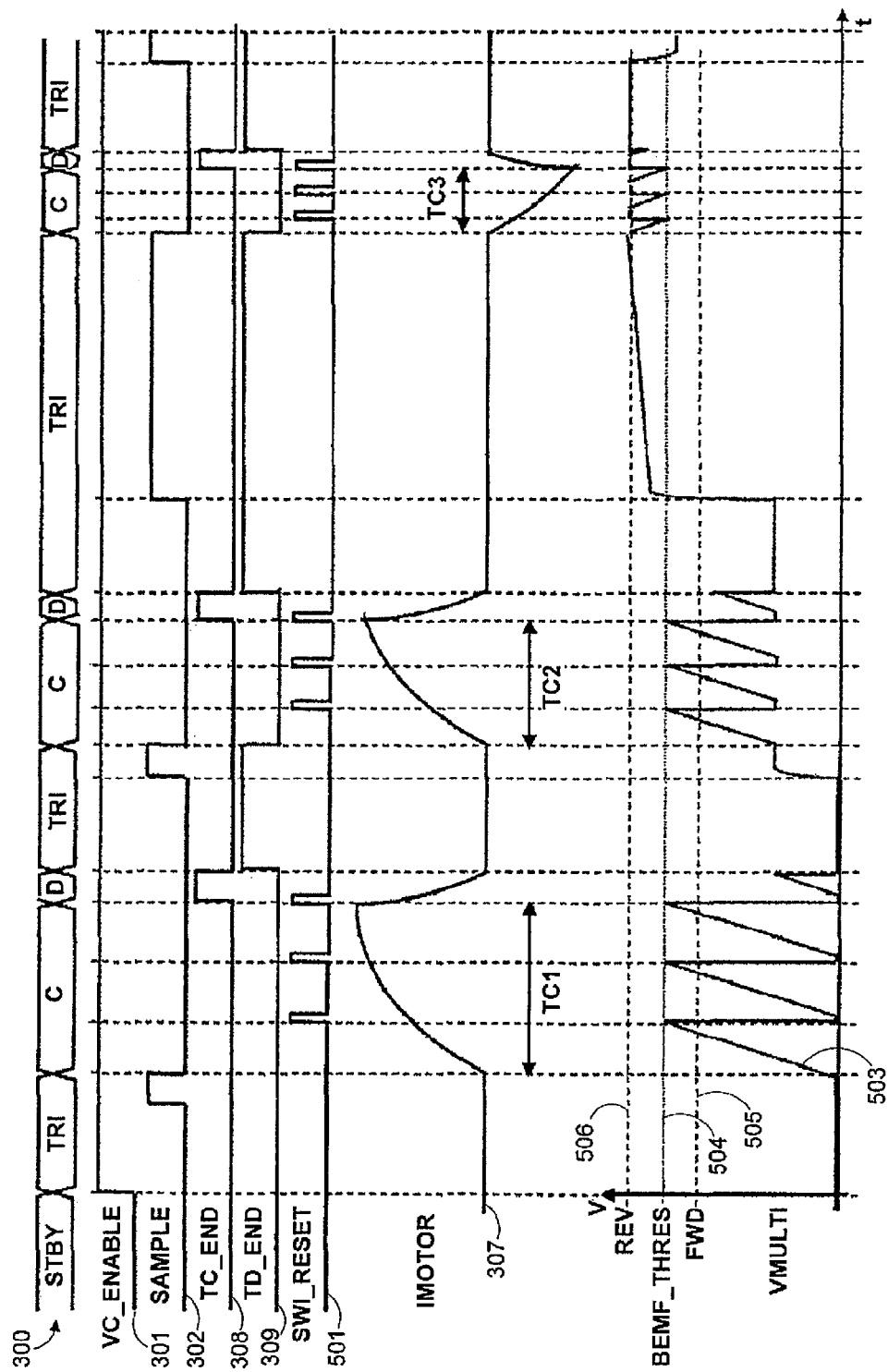
FIG. 5 shows representative signal waveforms during operation of the circuit of FIG. 4.

The case of N=3 is shown in FIG. 5. This case is similar to FIG. 3, except that while each SWI_RESET pulse 501 resets the voltage 503 on capacitor 422, because TC_END is not asserted until N SWI_RESET pulses occur, $I_{MOTOR}$ continues to increase (in TC1 and TC2) or decrease (in TC3) after each SWI_RESET pulse, until the Nth SWI_RESET pulse when. TC_END also is asserted. As discussed above, this allows wider pulses without increasing the size of capacitor 112, or alternatively allows pulses of the same width with reduced capacitor size.

It will be appreciated that $V_{REF}$, BEMF$_{THRES}$, and the FWD and REV threshold levels (in all embodiments), as well as the value of N (in an embodiment such as that of FIGS. 4 and 5), may be treated as parameters and selected to account for characteristics of the VCM being controlled. These parameters ordinarily would not be changeable "on the fly" or in the field by an end user, but may be changeable at the time of disk drive assembly to account for characteristics of the particular disk drive model, or even of the individual drive.

Thus it is seen that a method and apparatus for controlling voice coil motor speed more accurately has been provided.

Referring now to FIGS. 6-12, exemplary implementations of embodiments of the present invention are shown.

Figure 6:
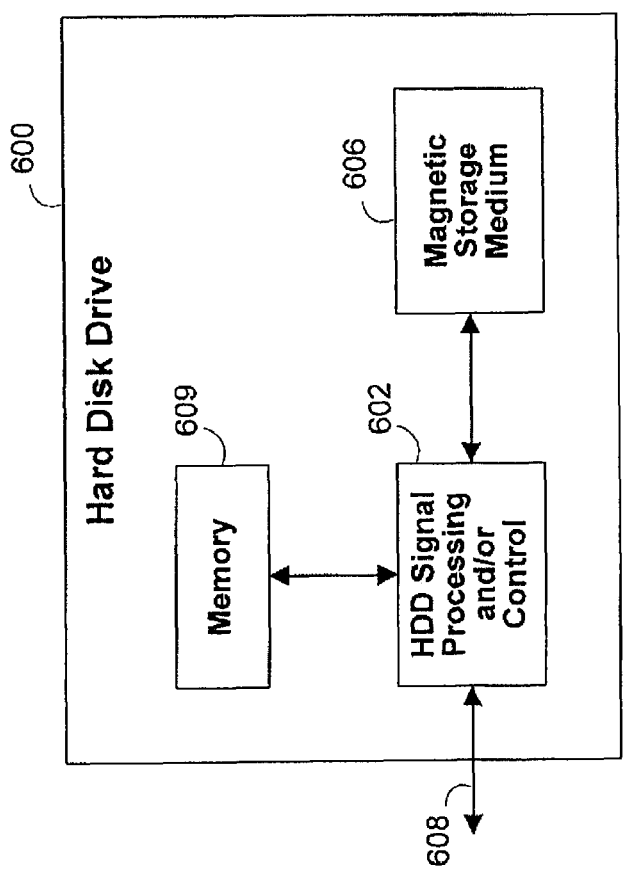
FIG. 6 is a block diagram of an exemplary hard disk drive that can employ the disclosed technology.

Referring now to FIG. 6, an embodiment of the present invention can be implemented in a hard disk drive 600. The present invention may be implement in signal processing and/or control circuits, which are generally identified in FIG. 6 at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606.

The HDD 600 may communicate with a host device (not shown) such as a computer, mobile computing devices such as personal digital assistants, cellular telephones, media or MP3 players and the like, and/or other devices, via one or more wired or wireless communication links 608. The HDD 600 may be connected to memory 609 such as random access memory (RAM), low latency nonvolatile memory such as flash memory, read only memory (ROM) and/or other suitable electronic data storage.

Figure 7:
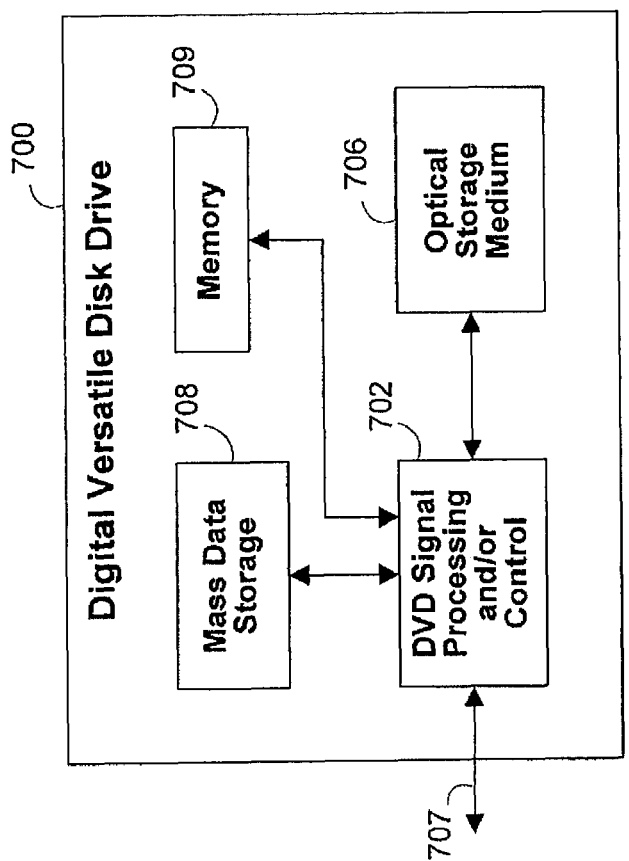
FIG. 7 is a block diagram of an exemplary digital versatile disk drive that can employ the disclosed technology.

Referring now to FIG. 7, an embodiment of the present invention can be implemented in a digital versatile disk (DVD) drive 700. The present invention may be implemented in either or both signal processing and/or control circuits, which are generally identified in FIG. 7 at 702, and/or mass data storage of the DVD drive 700. The signal processing and/or control circuit 702 and/or other circuits (not shown) in the DVD drive 700 may process data, perform coding and/or encryption, perform calculations, and/or format data that is read from and/or data written to an optical storage medium 706. In some implementations, the signal processing and/or control circuit 702 and/or other circuits (not shown) in the DVD drive 700 can also perform other functions such as encoding and/or decoding and/or any other signal processing functions associated with a DVD drive.

DVD drive 700 may communicate with an output device (not shown) such as a computer, television or other device, via one or more wired or wireless communication links 707. The DVD drive 700 may communicate with mass data storage 708 that stores data in a nonvolatile manner. The mass data storage 708 may include a hard disk drive (HDD). The HDD may have the configuration shown in FIG. 6. The HDD may be a mini-HDD that includes one or more platters having a diameter that is smaller than approximately 1.8". The DVD drive 700 may be connected to memory 709 such as RAM, ROM, low-latency nonvolatile memory such as flash memory, and/or other suitable electronic data storage.

Figure 8:
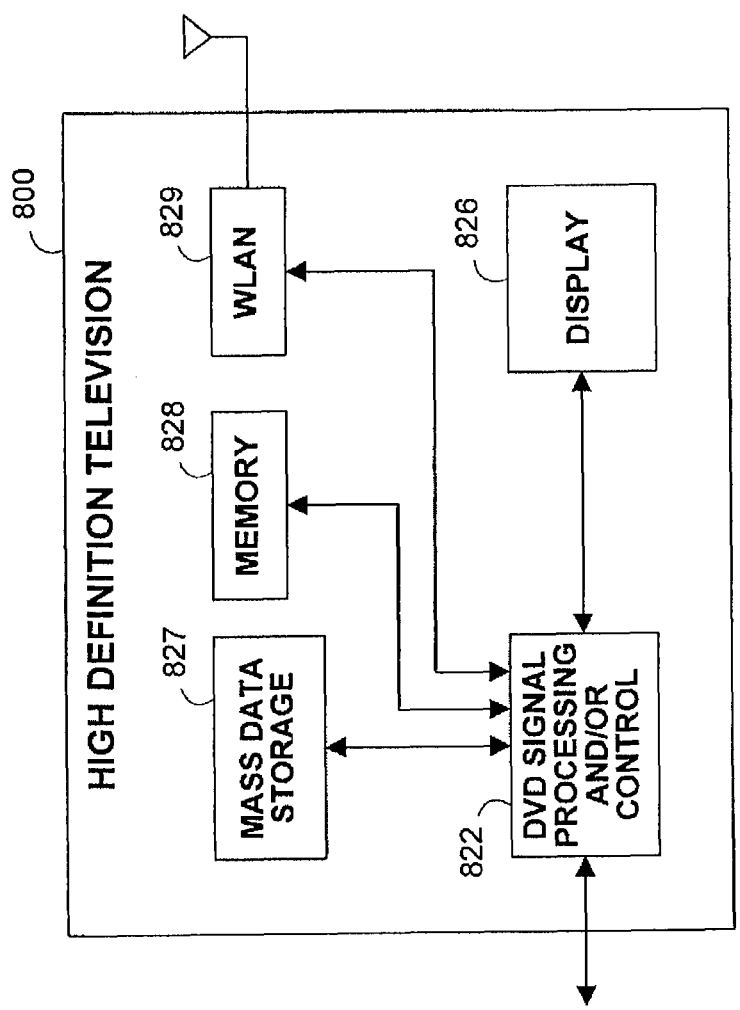
FIG. 8 is a block diagram of an exemplary high definition television that can employ the disclosed technology.

Referring now to FIG. 8, an embodiment of the present invention can be implemented in a high definition television (HDTV) 800. The present invention may implement either or both signal processing and/or control circuits, which are generally identified in FIG. 8 at 822, a WLAN interface and/or mass data storage of the HDTV 800. The HDTV 800 receives HDTV input signals in either a wired or wireless format and generates HDTV output signals for a display 826. In some implementations, signal processing circuit and/or control circuit 822 and/or other circuits (not shown) of the HDTV 800 may process data, perform coding and/or encryption, perform calculations, format data and/or perform any other type of HDTV processing that may be required.

The HDTV 800 may communicate with mass data storage 827 that stores data in a nonvolatile manner such as optical and/or magnetic storage devices. At least one HDD may have the configuration shown in FIG. 76 and/or at least one DVD drive may have the configuration shown in FIG. 7. The HDD may be a mini-HDD that includes one or more platters having a diameter that is smaller than approximately 1.8". The HDTV 800 may be connected to memory 828 such as RAM, ROM, low-latency nonvolatile memory such as flash memory, and/or other suitable electronic data storage. The HDTV 800 also may support connections with a WLAN via a WLAN network interface 829.

Figure 9:
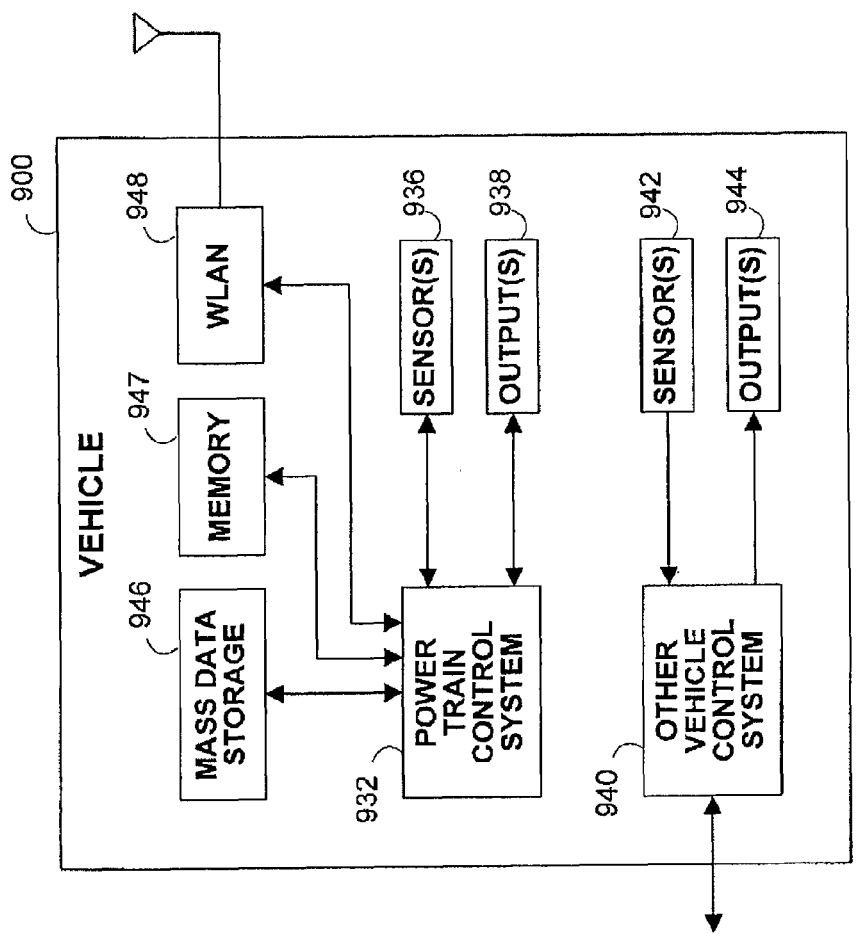
FIG. 9 is a block diagram of an exemplary vehicle that can employ the disclosed technology.

Referring now to FIG. 9, an embodiment of the present invention implements a control system of a vehicle 900, a WLAN interface and/or mass data storage of the vehicle control system. In some implementations, the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

An embodiment of the present invention may also be implemented in other control systems 940 of the vehicle 900. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 6 and/or at least one DVD drive may have the configuration shown in FIG. 7. The HDD may be a mini-HDD that includes one or more platters having a diameter that is smaller than approximately 1.8". The powertrain control system 932 may be connected to memory 947 such as RAM, ROM, low latency nonvolatile memory such as flash memory, and/or other suitable electronic data storage. The powertrain control system 932 also may support connections with a WLAN via a WLAN network interface 948. The control system 940 may also include mass data storage, memory and/or a WLAN interface (none shown).

Figure 10:
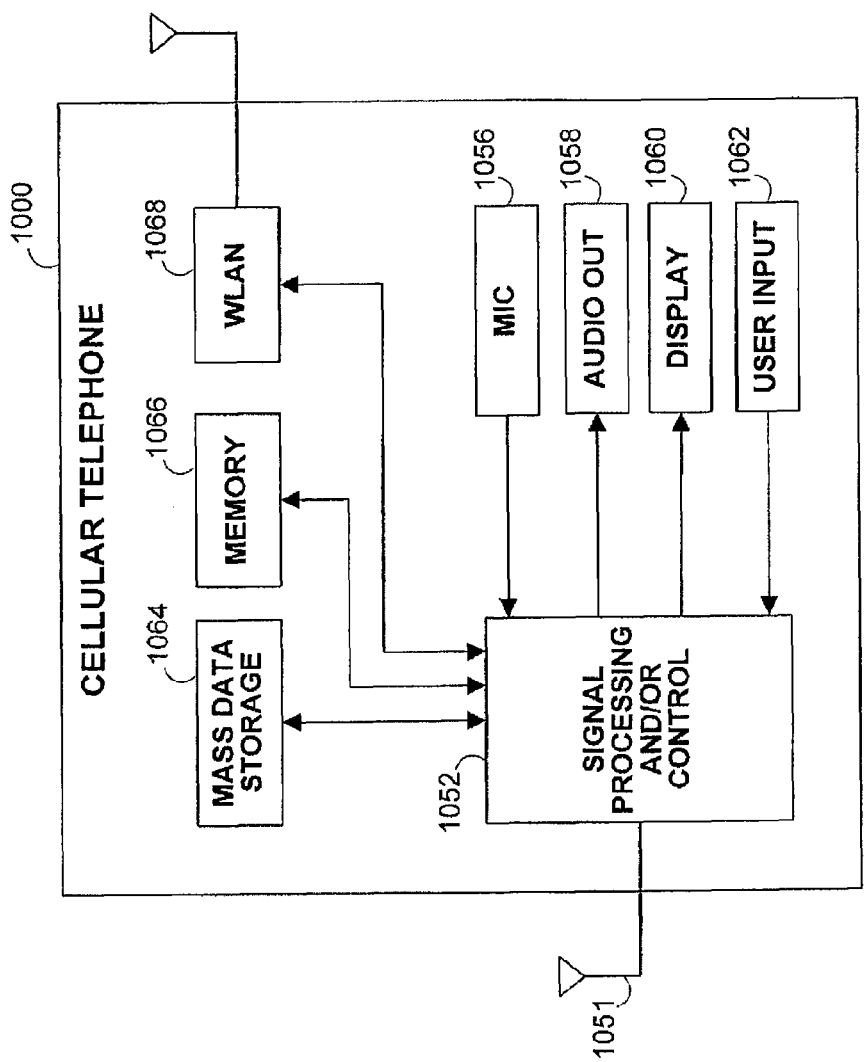
FIG. 10 is a block diagram of an exemplary cellular telephone that can employ the disclosed technology.

Referring now to FIG. 10, an embodiment of the present invention can be implemented in a cellular telephone 1000 that may include a cellular antenna 1051. The present invention may implement either or both signal processing and/or control circuits, which are generally identified in FIG. 10 at 1052, a WLAN interface and/or mass data storage of the cellular phone 1000. In some implementations, the cellular telephone 1000 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular telephone 1000 may process data, perform coding and/or encryption, perform calculations, format data and/or perform other cellular telephone functions.

The cellular telephone 1000 may communicate with mass data storage 1064 that stores data in a nonvolatile manner such as optical and/or magnetic storage devices—for example hard disk drives (HDDs) and/or DVDs. At least one HDD may have the configuration shown in FIG. 6 and/or at least one DVD drive may have the configuration shown in FIG. 7. The HDD may be a mini-HDD that includes one or more platters having a diameter that is smaller than approximately 1.8". The cellular telephone 1000 may be connected to memory 1066 such as RAM, ROM, low-latency nonvolatile memory such as flash memory, and/or other suitable electronic data storage. The cellular telephone 1000 also may support connections with a WLAN via a WLAN network interface 1068.

Figure 11:
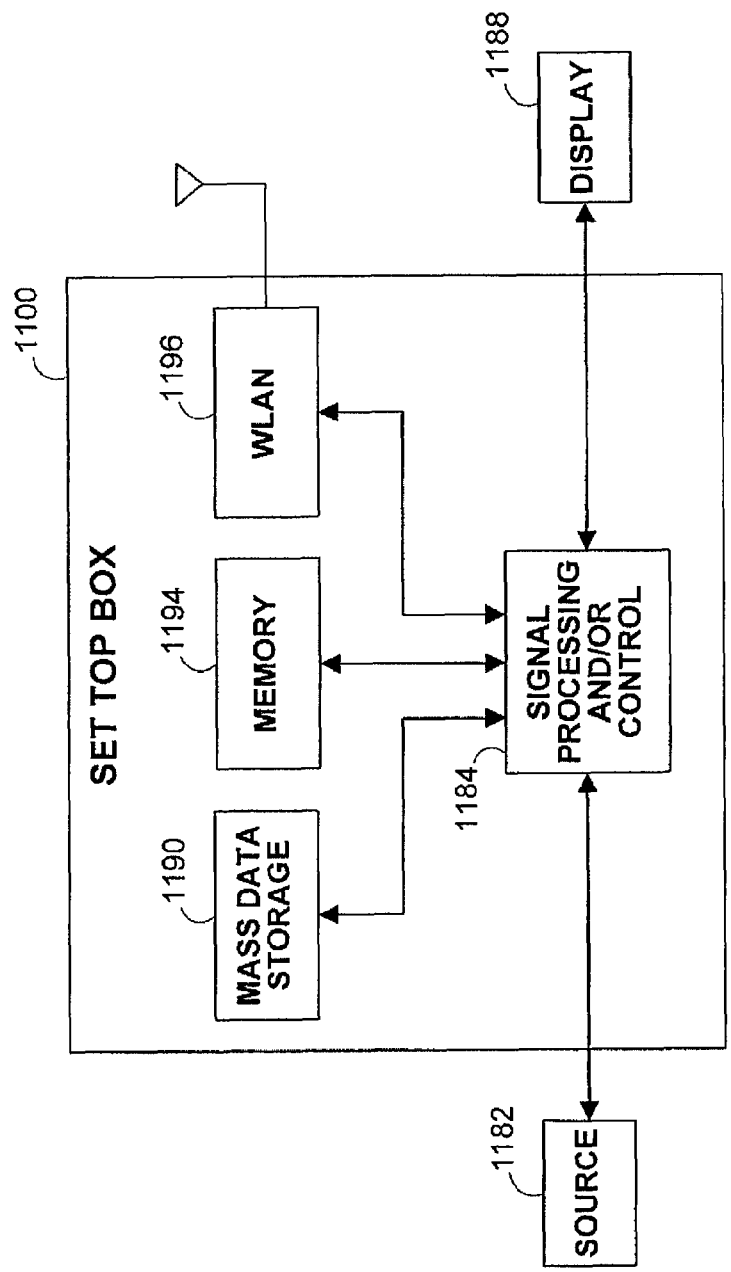
FIG. 11 is a block diagram of an exemplary set top box that can employ the disclosed technology.

Referring now to FIG. 11, an embodiment of the present invention can be implemented in a set top box 1100. The present invention may implement either or both signal processing and/or control circuits, which are generally identified in FIG. 11 at 1184, a WLAN interface and/or mass data storage of the set top box 1100. Set top box 1100 receives signals from a source 1182 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1100 may process data, perform coding and/or encryption, perform calculations, format data and/or perform any other set top box function.

Set top box 1100 may communicate with mass data storage 1190 that stores data in a nonvolatile manner. The mass data storage 1190 may include optical and/or magnetic storage devices for example hard disk drives HDD and/or DVDs. At least one HDD may have the configuration shown in FIG. 6 and/or at least one DVD drive may have the configuration shown in FIG. 7. The HDD may be a mini-HDD that includes one or more platters having a diameter that is smaller than approximately 1.8". Set top box 1100 may be connected to memory 1194 such as RAM, ROM, low-latency nonvolatile memory such as flash memory, and/or other suitable electronic data storage. Set top box 1100 also may support connections with a WLAN via a WLAN network interface 1196.

Figure 12:
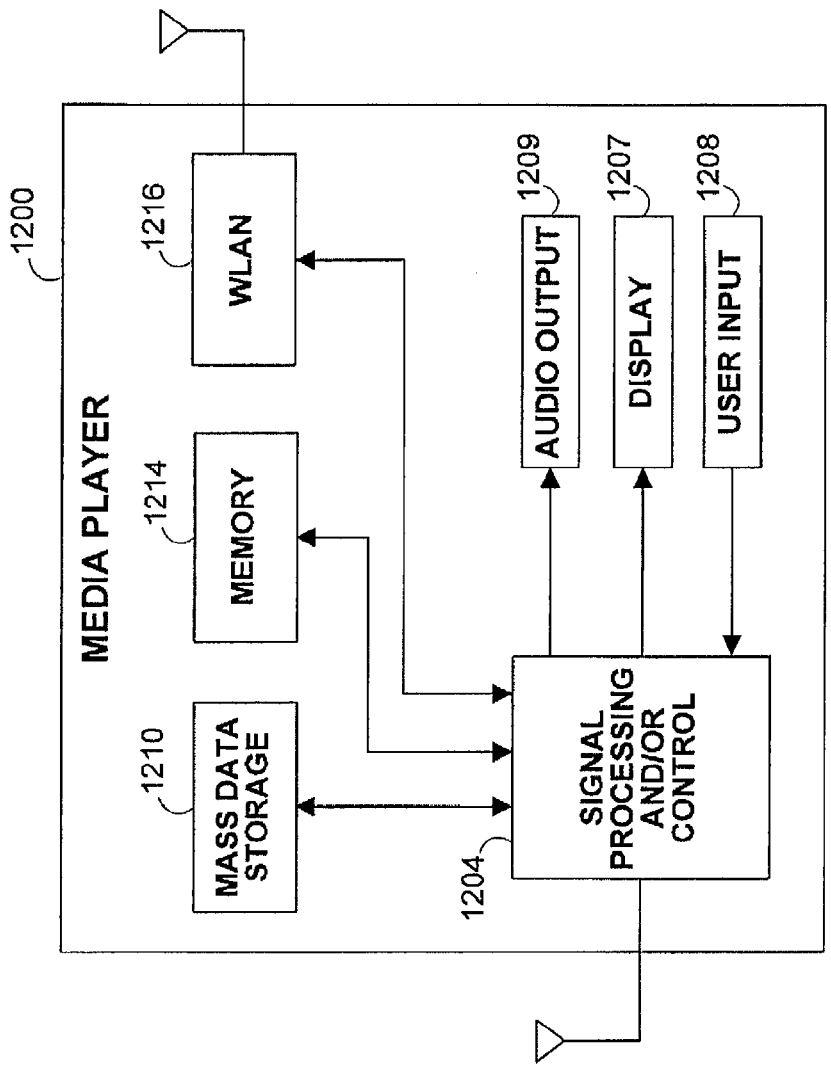
FIG. 12 is a block diagram of an exemplary media player that can employ the disclosed technology.

Referring now to FIG. 12, an embodiment of the present invention can be implemented in a media player 1200. The present invention may implement either or both signal processing and/or control circuits, which are generally identified in FIG. 12 at 1204, a WLAN interface and/or mass data storage of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. Media player 1200 further includes an audio output 1209 such as a speaker and/or audio output jack. The signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6 and/or at least one DVD drive may have the configuration shown in FIG. 7. The HDD may be a mini-HDD that includes one or more platters having a diameter that is smaller than approximately 1.8". Media player 1200 may be connected to memory 1214 such as RAM, ROM, low-latency nonvolatile memory such as flash memory, and/or other suitable electronic data storage. Media player 1200 also may support connections with a WLAN via a WLAN network interface 1216. Still other implementations in addition to those described above are contemplated.

It will be understood that the foregoing is only illustrative of the principles of the invention, and that the invention can be practiced by other than the described embodiments, which are presented for purposes of illustration and not of limitation.

What is claimed is:

1. Apparatus for deriving control pulse width for pulse width modulation motor speed control, said apparatus comprising:
    a sample-and-hold circuit that samples a back-EMF of a motor to be controlled, said sample-and-hold circuit comprising a first analog storage element to be charged to said sampled back-EMF and a switch for connecting said first analog storage element to said sampled back-EMF;
    a supply of constant current that applies current to bring said sampled back-EMF as stored on said first analog storage element to a target back-EMF; and
    a pulse generator that indicates said pulse width based on time required to bring said sampled back-EMF as stored on said first analog storage element to said target back-EMF.

2. The apparatus of claim 1 further comprising a threshold detector for measuring said back-EMF of the motor to be controlled, whereby said sample-and-hold circuit samples said measured back-EMF only when said measured back-EMF exceeds a threshold.

3. The apparatus of claim 2 wherein said threshold is programmable.

4. The apparatus of claim 1 wherein said supply of constant current comprises:
    a current source that applies current when said sampled back-EMF as stored on said first analog storage element is less than said target back-EMF; and
    a current sink that draws current when said sampled back-EMF as stored on said first analog storage element exceeds said target back-EMF.

5. The apparatus of claim 1 wherein said pulse generator comprises a circuit that assumes a state when said sampled back-EMF as stored on said first analog storage element is equal to said target back-EMF.

6. The apparatus of claim 1 further comprising:
    a buffer for storing said sampled back-EMF from said first analog storage element in said sample-and-hold circuit;
    a second analog storage element;
    a second switch for connecting said second analog storage element to said buffer;
    a circuit element that assumes a state when said sampled back-EMF as stored on said second analog storage element is equal to said target back-EMF;
    a counter that increments when said circuit element assumes said state, and outputs a signal after said circuit element assumes said state a predetermined number of times; and
    circuitry for closing said second switch to return said second analog storage element to said sampled back-EMF; wherein:
    said pulse generator outputs a pulse after said circuit element assumes said state a predetermined number of times.

7. The apparatus of claim 6 wherein said circuit element is a multiplexer that selects an output having said state when said sampled back-EMF as stored on said second analog storage element is equal to said target back-EMF.

8. The apparatus of claim 1 wherein said motor is a voice coil motor.

9. A method for retracting a disk drive head, said method comprising:
    detecting triggering of a retraction event;
    sampling a back-EMF of a head retraction motor;
    charging an analog electrical energy storage element to said sampled back-EMF;
    applying current to bring said sampled back-EMF as stored on said analog electrical energy storage element to a target back-EMF;
    setting said pulse width based on time required to bring said sampled back-EMF as stored on said analog electrical energy storage element to said target back-EMF;
    determining whether said head has been retracted; and
    repeating said sampling, said charging, said applying, said setting and said determining until said determining has determined that said head has been retracted.

10. The method of claim 9 wherein said sampling comprises measuring said back-EMF and taking a sample only when said measured back-EMF exceeds a threshold.

11. The method of claim 10 wherein said threshold is programmable.

12. The method of claim 9 wherein said applying comprises:
    sourcing current when said sampled back-EMF as stored on said analog electrical energy storage element is less than said target back-EMF; and
    sinking current when said sampled back-EMF as stored on said analog electrical energy storage element exceeds said target back-EMF.

13. The method of claim 9 wherein said setting comprises setting said pulse width equal to time required to bring said sampled back-EMF as stored on said analog electrical energy storage element to said target back-EMF.

14. The method of claim 9 further comprising:
    incrementing a counter upon bringing said sampled back-EMF as stored on said analog electrical energy storage element to said target back-EMF;
    repeating said sampling, said charging, said applying and said incrementing until a predetermined number is reached in said counter; wherein:
    said setting comprises setting said pulse width based on time required to reach said predetermined number in said counter.

15. Apparatus for retracting a disk drive head, said apparatus comprising:
    means for detecting triggering of a retraction event;
    means for sampling a back-EMF of a head retraction motor;
    means for charging a capacitor to said sampled back-EMF;
    means for applying current to bring said sampled back-EMF as stored on said capacitor to a target back-EMF;
    means for setting said pulse width based on time required to bring said sampled back-EMF as stored on said capacitor to said target back-EMF;

means for determining whether said head has been retracted; and means for repeating said sampling, said charging, said applying, said setting and said determining until said determining has determined that said head has been retracted.

16. The apparatus of claim 15 wherein said means for sampling comprises means for measuring said back-EMF and taking a sample only when said measured back-EMF exceeds a threshold.

17. The apparatus of claim 16 wherein said threshold is programmable.

18. The apparatus of claim 15 wherein said means for applying comprises:

means for sourcing current when said sampled back-EMF as stored on said capacitor is less than said target back-EMF; and means for sinking current when said sampled back-EMF as stored on said capacitor exceeds said target back-EMF.

19. The apparatus of claim 15 wherein said means for setting comprises means for setting said pulse width based on time required to bring said sampled back-EMF as stored on said capacitor to said target back-EMF.

20. The apparatus of claim 15 further comprising:

means for counting each time said sampled back-EMF as stored on said capacitor is brought to said target back-EMF;

means for repeating said sampling, said charging, said applying and said counting until a predetermined number is reached in said counting; wherein:

said means for setting comprises means for setting said pulse width based on time required to reach said predetermined number in said counting.

* * * * *